US008156376B2

(12) United States Patent
Chen (10) Patent No.: US 8,156,376 B2
(45) Date of Patent: Apr. 10, 2012

(54) METHOD, DEVICE AND SYSTEM FOR STORING DATA IN CACHE IN CASE OF POWER FAILURE (75) Inventor: Liyao Chen, Shenzhen (CN)

(73) Assignee: Chengdu Huawei Symantec Technologies Co., Ltd., Sichuan (CN)

( * ) Notice: Subject to any disclaimer, the term of this patent is extended or adjusted under 35 U.S.C. 154(b) by 83 days.

(21) Appl. No.: 12/607,640

(22) Filed: Oct. 28, 2009

(65) Prior Publication Data
US 2010/0121992 A1 May 13, 2010

(51) Int. Cl.
G06F 11/00 (2006.01)
(52) U.S. Cl. ............... 714/24; 714/6.3; 714/14; 714/22
(58) Field of Classification Search .............. 714/10, 714/14, 22, 24, 6.1, 6.3
See application file for complete search history.

(56) References Cited

U.S. PATENT DOCUMENTS

| 5,519,831 | A | 5/1996 | Holzhammer |  |
|---|---|---|---|---|
| 5,603,038 | A | 2/1997 | Crump et al. |  |
| 5,724,542 | A | 3/1998 | Taroda et al. |  |
| 5,828,823 | A | 10/1998 | Byers et al. |  |
| 6,502,205 | B1 * | 12/2002 | Yanai et al. | 714/6.32 |
| 6,725,397 | B1 * | 4/2004 | Emberty et al. | 714/24 |
| 7,634,688 | B2 * | 12/2009 | Madter et al. | 714/24 |
| 7,685,466 | B2 * | 3/2010 | Dunstan et al. | 714/24 |
| 7,800,856 | B1 * | 9/2010 | Bennett et al. | 714/24 |
| 7,870,338 | B2 * | 1/2011 | Iida et al. | 714/14 |
| 2002/0004890 | A1 |  1/2002 | Ofek et al. |  |
| 2004/0190210 | A1 |  9/2004 | Leete |  |
| 2006/0242458 | A1 * | 10/2006 | Feldman et al. | 714/14 |
| 2007/0260922 | A1 * | 11/2007 | Cao et al. | 714/24 |
| 2008/0016274 | A1 |  1/2008 | Wang et al. |  |

FOREIGN PATENT DOCUMENTS

| CN | 1302017 | A | 7/2001 |
| CN | 1525310 | A | 9/2004 |
| CN | 101183801 | A | 5/2008 |
| CN | 101446926 | A | 6/2009 |
| JP | 6-243041 | A | 9/1994 |
| JP | 6-309234 | A | 11/1994 |
| JP | 7-248973 | A | 9/1995 |

(Continued)

OTHER PUBLICATIONS

State Intellectual Property Office of the People's Republic of China, International Search Report of the International Searching Authority in International Patent Application No. PCT/CN2009/073081 (Nov. 12, 2009).

(Continued)

Primary Examiner — Robert Beausoliel, Jr.
Assistant Examiner — Joseph D Manoskey
(74) Attorney, Agent, or Firm — Leydig, Voit & Mayer, Ltd.

(57) ABSTRACT

A method, device and system for storing data in a cache in case of power failure are disclosed. The method includes: in case of power failure of a storage system, receiving configuration information from a central processing unit (CPU); establishing a mapping relationship between an address of data in the cache and an address in a storage device according to the configuration information; sending a signaling message that carries the mapping relationship to the cache, so that the cache migrates the data to the storage device according to the signaling message.

13 Claims, 5 Drawing Sheets

FOREIGN PATENT DOCUMENTS

| | | |
|---|---|---|
| JP | 11-306674 A | 11/1999 |
| JP | 2000-357059 A | 12/2000 |
| JP | 2006-031630 A | 2/2006 |
| JP | 2008-108026 A | 5/2008 |
| JP | 2008-192028 A | 8/2008 |
| WO | WO 97/33229 A1 | 9/1997 |

OTHER PUBLICATIONS

State Intellectual Property Office of the People's Republic of China, Examination Report in Chinese Patent Application No. 200810172111.5 (Jan. 22, 2010).

European Patent Office, Extended European Search Report in European Patent Application No. 09175388.9 (Mar. 2, 2010).

European Patent Office, Examination Report in European Patent Application No. 09175388.9 (Jun. 15, 2010).

Rejection Decision in corresponding Japanese Application No. 2009-241390 (Sep. 30, 2011).

Written Opinion of the International Searching Authority in corresponding PCT Application No. PCT/CN2009/073081 (Nov. 12, 2009).

* cited by examiner

METHOD, DEVICE AND SYSTEM FOR STORING DATA IN CACHE IN CASE OF POWER FAILURE

CROSS-REFERENCE TO RELATED APPLICATIONS

This application claims priority to Chinese Patent Application No. 200810172111.5, filed Nov. 10, 2008 and to International Patent Application No. PCT/CN2009/073081, filed Aug. 4, 2009, both of which are hereby incorporated by reference in their entireties.

FIELD OF THE INVENTION

The present invention relates to the storage field, and in particular, to a method, device and system for storing data in a cache in case of power failure.

BACKGROUND OF THE INVENTION

Figure 1:
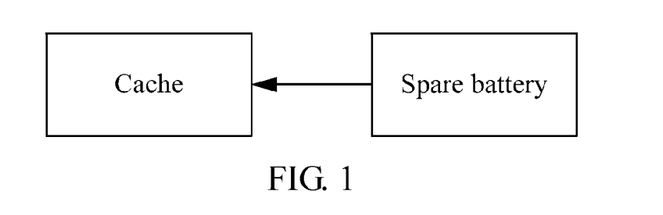
FIG. 1 is a schematic diagram illustrating the supply of power to a cache by a spare battery in the conventional art.

A storage system uses a cache to respond to a host request faster. After receiving a write request from a host, the storage system writes the host data into the cache and returns a response indicating completion of the host request. Then, the storage system may write the data in the cache into a magnetic disk at proper time. Although the cache enables the storage system to respond to the host request faster, the data in the cache may be lost in case of power failure of the storage system. Thus, the storage system with a cache supports data protection in case of power failure. In the conventional art, upon power failure of the storage system, the cache is powered on by a spare battery, so that the cache is refreshed constantly, which ensures that the data in the cache is not lost. As shown in FIG. 1, in case of power failure, the storage system cuts off all the services, and supplies power to the cache through the spare battery.

During the implementation of the invention, the inventor finds that the conventional art has at least the following weaknesses:

In case of long-term power failure, the cache in the storage system cannot be refreshed continuously due to the limited battery capacity, thus losing the data in the cache.

SUMMARY OF THE INVENTION

Embodiments of the present invention provide a method, device and system for storing data in a cache in case of power failure to back up and protect data in the cache in case of power failure of a storage device.

A method for storing data in a cache in an embodiment of the present invention includes: (1) receiving configuration information from a central processing unit (CPU) in case of power failure of a storage system; and (2) establishing a mapping relationship between an address of data in the cache and an address in a storage device; and (3) sending a signaling message that carries the mapping relationship to the cache, so that the cache migrates the stored data to the storage device according to the signaling message.

An auxiliary logic device provided in an embodiment of the present invention includes: (1) a receiving unit, adapted to receive configuration information from a CPU in case of power failure of a storage system; (2) a mapping unit, adapted to establish a mapping relationship between an address of data in a cache and an address in a storage device according to the configuration information received by the receiving unit; and (3) a transmitting unit, adapted to send a signaling message that carries the mapping relationship established by the mapping unit, so that the cache migrates the data to the storage device according to the signaling message.

A storage system provided in an embodiment of the present invention includes an auxiliary logic device, a CPU, a cache and a storage device, where: (1) the CPU is adapted to send configuration information to the auxiliary logic device; (2) the auxiliary logic device is adapted to: receive the configuration information from the CPU, and send a signaling message that carries a mapping relation between an address of data in the cache and an address in the storage device according to the configuration information; (3) the cache is adapted to: store data, receive the signaling message from the auxiliary logic device in case of power failure of the storage system, and migrate the data to the storage device according to the signaling message; and (4) the storage device is adapted to store the data migrated from the cache in case of power failure of the storage system.

Compared with the conventional art, embodiments of the present invention have the following merits:

In embodiments of the present invention, in case of power failure of the storage system, a mapping relationship is established according to the configuration information, and the data in the cache is migrated to other storage devices. Thus, the data in the cache is written to the storage device in backup mode, which protects the data in the cache and ensures that the data is not lost.

DETAILED DESCRIPTION OF THE EMBODIMENTS

The technical solution of the present invention is hereinafter described in detail with reference to the accompanying drawings. It is evident that the embodiments are exemplary only and the present invention is not limited to such embodiments. Other embodiments that those skilled in the art derive from the embodiments of the present invention also fall in the scope of protection of the present invention.

Figure 2:
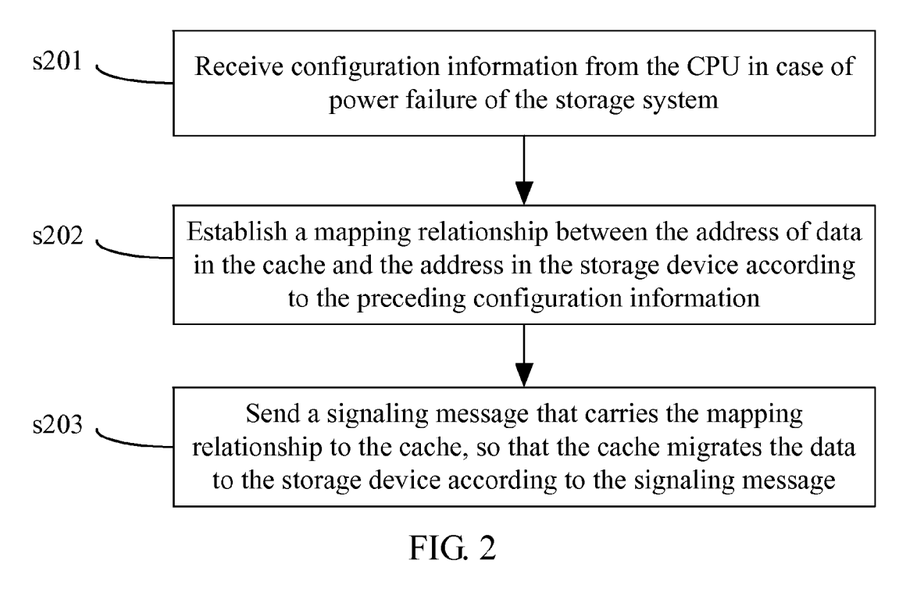
FIG. 2 is a schematic diagram showing the flowchart of a method according to an embodiment of the present invention.

As shown in FIG. 2, a method for storing data in the cache in case of power failure according to an embodiment of the present invention includes the following steps:

s201: Configuration information is received from the CPU in case of power failure of the storage system.

s202: A mapping relationship is established between the address of data in the cache and the address in the storage device according to the preceding configuration information.

s203: A signaling message that carries the preceding mapping relationship is sent to the cache, so that the cache migrates the data to the storage device according to the signaling message.

According to the method provided in this embodiment, in case of power failure of the storage system, the data in the cache is migrated to other storage devices for the backup purpose according to the mapping relationship based on the configuration information. Thus, the data in the cache is written to the storage device in the backup mode, which protects the data in the cache and ensures that the data is not lost in case of power failure of the storage system.

According to a method provided in another embodiment, the data in the cache is written to the storage device in the backup mode through an auxiliary logic device in case of power failure of the storage system. The storage system can still store data in case of power failure, and thus may be called a non-failing device hereinafter. The auxiliary logic device may be a direct memory access (DMA) controller (generally integrated into a bridge chip) or application specific integrated circuit (ASIC) system logic.

Figure 3:
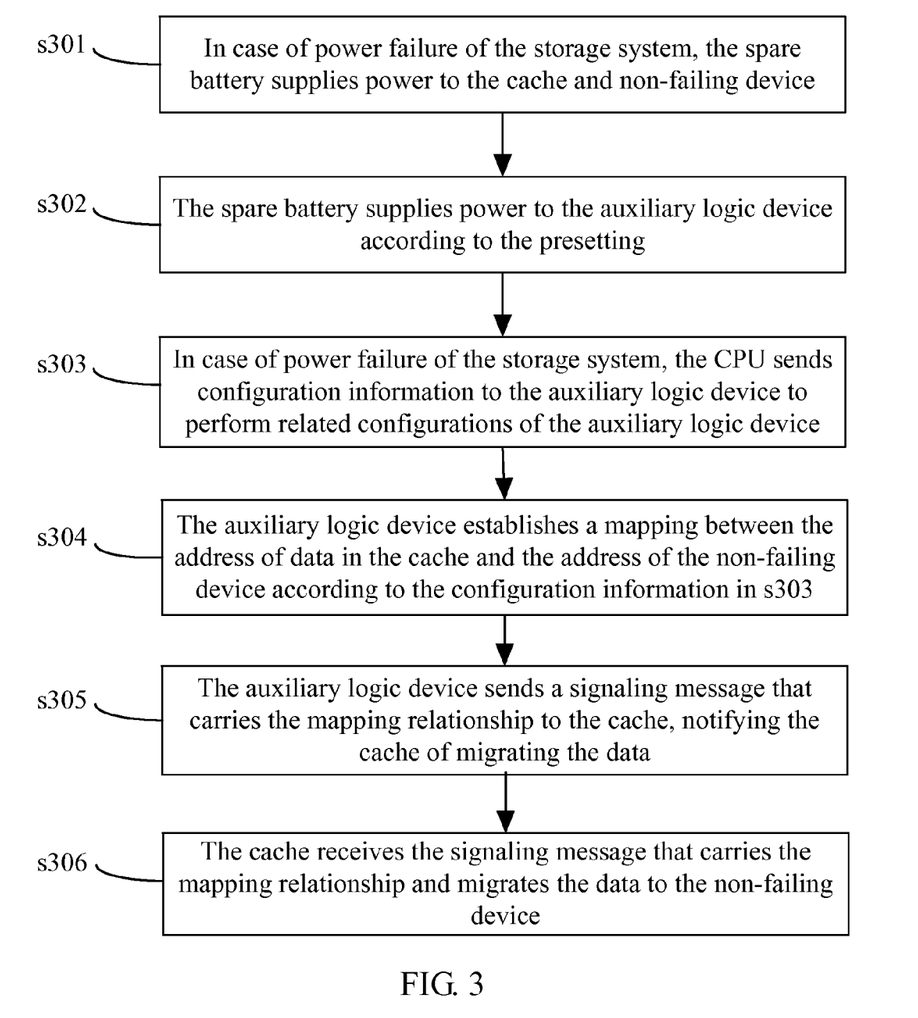
FIG. 3 is a schematic diagram showing the flowchart of a method according to another embodiment of the present invention.

As shown in FIG. 3, a method for storing data in the cache in case of power failure according to an embodiment of the present invention includes the following steps:

s301: In case of power failure of the storage system, the spare battery supplies power to the cache and the non-failing device.

s302: The spare battery supplies power to the auxiliary logic device according to the presetting.

The auxiliary logic device can be configured (for example, DMA loading and address mapping) only when other peripherals work normally at the same time.

s303: In case of power failure of the storage system, the CPU sends configuration information to the auxiliary logic device to perform related configurations of the auxiliary logic device.

Within a short period of time upon the power failure of the system or before the spare battery supplies power to the system, the CPU sends configuration information to the auxiliary logic device by using the power stored in the capacitor or supplied by the spare battery, where the configuration information includes the source address and destination address of data transmission, size of the data to be transmitted, and data transmission direction. Then, the CPU is powered off, and does not participate in the subsequent data storage.

s304: The auxiliary logic device establishes a mapping relationship between the address of data in the cache and the address in the non-failing device according to the configuration information in s303.

s305: The auxiliary logic device sends a signaling message that carries the mapping relationship to the cache, notifying the cache of migrating the data.

s306: The cache receives the signaling message that carries the mapping relationship, and migrates the data to the non-failing device.

In this process, the data is migrated from all cache blocks to the non-failing device. The cache that requires data backup may be divided into several blocks for backup.

In the method provided in this embodiment, the auxiliary logic device may be an independent device or be integrated into other devices, for example, North Bridge or South Bridge.

According to the method provided in this embodiment, in case of power failure of the storage system, the data in the cache is migrated to other storage devices according to the mapping relationship based on the configuration information. Thus, the data in the cache is written to the storage device in the backup mode, which protects the data in the cache and ensures that the data is not lost.

The following describes an embodiment of the present invention with reference to a specific scenario, in which the auxiliary logic device is a DMA controller integrated into a bridge chip.

Figure 4:
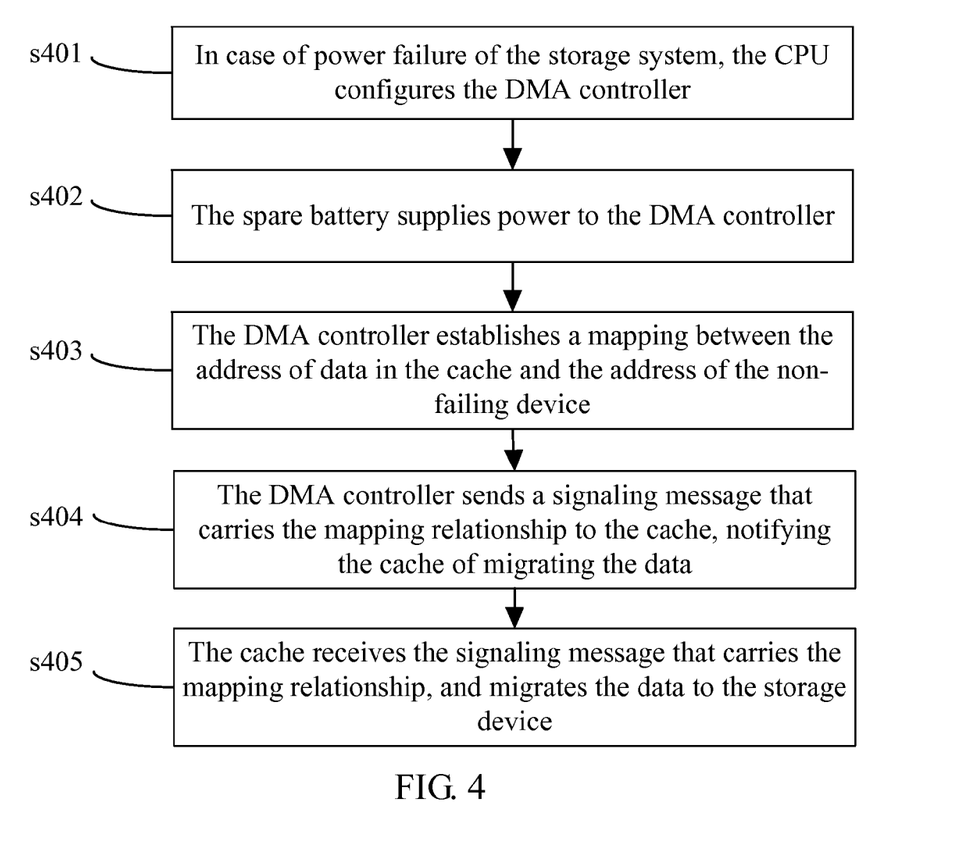
FIG. 4 is a schematic diagram showing the flowchart of a method according to another embodiment of the present invention.

As shown in FIG. 4, a method for storing data in the cache in case of power failure in an embodiment of the present invention includes the following steps:

s401: In case of power failure of the storage system, the CPU configures the DMA controller.

Within a short period of time upon the power failure of the system or before the spare battery supplies power to the system, the CPU configures the auxiliary logic device (that is, it configures the DMA controller) by using the power stored in the capacitor or supplied by the spare battery. The configuration includes: configuration of the source address and destination address of data transmission, size of data to be transmitted, and data transmission direction. In addition, the CPU sends a data transmission command to the DMA controller.

s402: The spare battery supplies power to the DMA controller.

After configuring the DMA controller, the CPU is powered off and does not participate in the subsequent data storage. The spare battery supplies power to the DMA controller, cache and non-failing device.

s403: The DMA controller establishes a mapping between the address of data in the cache and the address of the non-failing device.

The process of establishing the mapping by the DMA controller according to the configuration command of the CPU in case of power failure of the system is as follows. The DMA controller determines an address space according to the source address and destination address of the data transmission provided by the CPU, and creates a storage area in the non-failing device according to the size of the data that the CPU configures for the DMA controller, where the size of the storage area is equal to the size of transmitted data in the cache. Then, the address mapping is established.

s404: The DMA controller sends a signaling message that carries the mapping relationship to the cache, notifying the cache to migrate the data.

s405: The cache receives the signaling message that carries the mapping relationship, and migrates the data to the storage device.

The signaling message carries the mapping relationship and the size of the data that the cache is required to migrate. The cache migrates the data to the non-failing device according to the mapping relationship. The process of migrating the data from the cache to the non-failing device with the participation of the DMA controller is as follows. The cache migrates the data to a storage area that the DMA controller creates in the storage device according to the signaling message sent by the DMA controller; the source or destination address register value increases by 1 during every data migration until the size of the address space is equal to the size of the transmitted data. Then, the data migration ends.

According to the method provided in this embodiment, in case of power failure of the storage system, the data in the cache is migrated to other storage devices according to the mapping relationship based on the configuration information. Thus, the data in the cache is written to the storage device in backup mode, which protects the data in the cache and ensures that the data is not lost.

Figure 5:
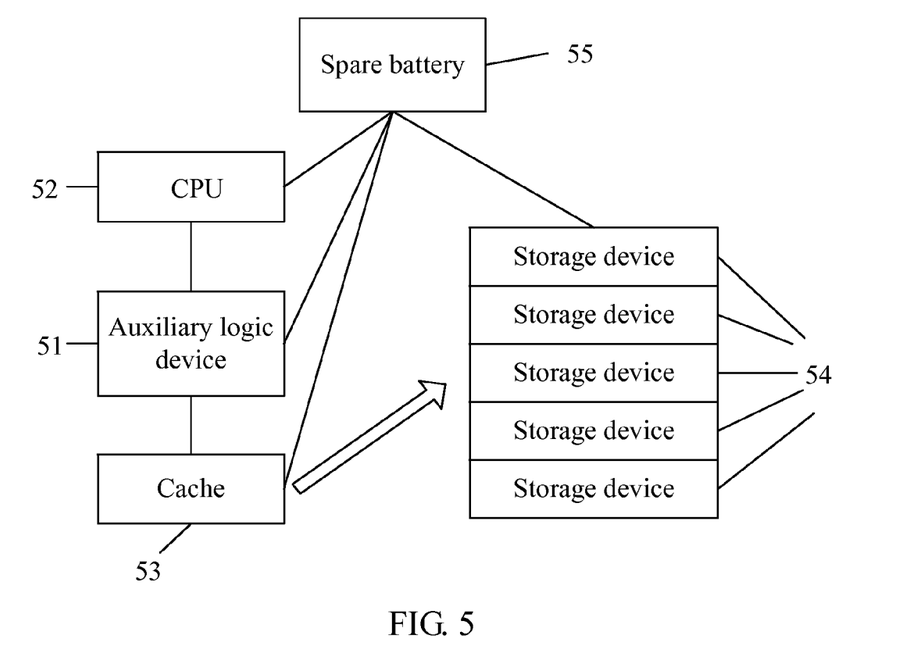
FIG. 5 a schematic diagram showing the structure of a storage system according to an embodiment of the present invention.

As shown in FIG. 5, a storage system provided in an embodiment of the present invention includes an auxiliary logic device 51, a CPU 52, a cache 53 and a storage device 54.

The auxiliary logic device 51 is adapted to: receive configuration information from the CPU 52, and send a signaling message that carries the mapping relationship between the address of data in the cache 53 and the address in the storage device to the cache 53 according to the configuration information, so that the cache 53 migrates the data to the storage device 54. The auxiliary logic device 51 may be a DMA controller or ASIC system logic, which may be an independent device or be integrated into other devices. Upon the power failure of the storage system, the auxiliary logic device 51 receives configuration information from the CPU 52, where the configuration information includes the source address and destination address of the data migration and size of data to be migrated. The auxiliary logic device 51 determines that the cache 53 is used as the address space for the source address and the destination address in the storage device 54, creates a storage area whose size is equal to the size of the data to be migrated in the cache 53 in the storage device 54, establishes a mapping between the source address and destination address of the data transmission, and sends a signaling message to the cache 53 to notify the cache 53 of migrating the data.

The CPU 52 is adapted to send configuration information to the auxiliary logic device 51 to configure the auxiliary logic device 51. The CPU 52 configures the auxiliary logic device 51 in case of power failure of the storage system. Upon completion of the configuration, the CPU 52 is powered off and does not participate in the subsequent data migration, which reduces the power consumption.

The cache 53 is adapted to: store data, receive a signaling message from the auxiliary logic device 51 in case of power failure of the storage system, and migrate the data to the storage device 54. In specific implementation, the cache 53 receives a signaling message from the auxiliary logic device 51, and migrates the data to the storage area that the auxiliary logic device 51 creates in the storage device 54; the source or destination address register value increases by 1 during every migration until the size of the address space is equal to the size of data to be transmitted. Then the migration ends.

The storage device 54 is adapted to store the data migrated from the cache 53 in case of power failure of the storage system. The storage device 54 can store the data even in case of power failure.

In another embodiment of the present invention, the system further includes a spare battery 55, which is adapted to supply power to one or multiple of the auxiliary logic device 51, CPU 52, cache 53 and storage device 54 in case of power failure of the storage system. The spare battery 55 may be integrated into the storage system or independent of the storage system.

According to the system provided in this embodiment, in case of power failure of the storage system, the data in the cache is migrated to other storage devices according to the mapping relationship based on the configuration information. Thus, the data in the cache is written to the storage device in the backup mode, which protects the data in the cache and ensures that the data is not lost.

Figure 6:
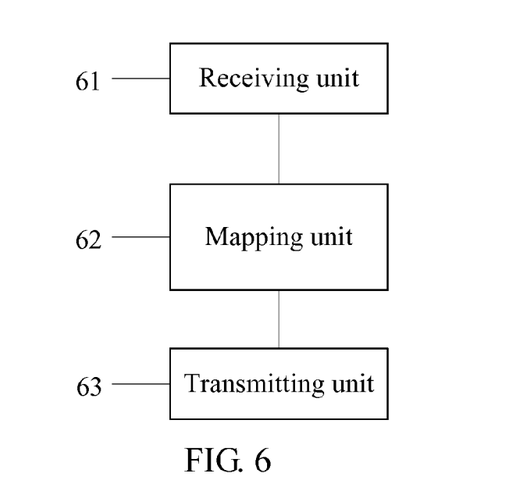
FIG. 6 a schematic diagram showing the structure of an auxiliary logic device according to an embodiment of the present invention.

An auxiliary logic device provided in this embodiment of the present invention may be a DMA controller or ASIC system logic, which may be an independent device or be integrated into other devices. In case of power failure of the storage system, the auxiliary logic device receives configuration information from the CPU, establishes a mapping relationship between the address of data in the cache and the address in the storage device, sends a signaling message to the cache, and notifies the cache of migrating the data. As shown in FIG. 6, the auxiliary logic device includes a receiving unit 61, a mapping unit 62, and a transmitting unit 63.

The receiving unit 61 is adapted to receive configuration information from the CPU in case of power failure of the storage system.

In specific implementation, the configuration information includes the source address and destination address of data transmission, size of data to be transmitted, and data transmission direction.

The mapping unit 62 is adapted to establish a mapping relationship between the address of data in the cache and the address in the storage device according to the configuration information received by the receiving unit 61.

In specific implementation, the mapping unit 62 determines the source address and destination address of data in the configuration information, creates an address space whose size is equal to the size of transmitted data in the storage device, and establishes a mapping relationship between the address of data in the cache and address in the storage device.

The transmitting unit 63 is adapted to send a signaling message that carries the mapping relationship established by the mapping unit 62 to the cache, so that the cache migrates the data to the storage device according to the signaling message.

In specific implementation, the transmitting unit 63 sends a signaling message to the cache to notify the cache of migrating the data, where the signaling message includes the size of data migrated by the cache and mapping relationship required for the data migration, so that the cache migrates the data to the storage device.

Figure 7:
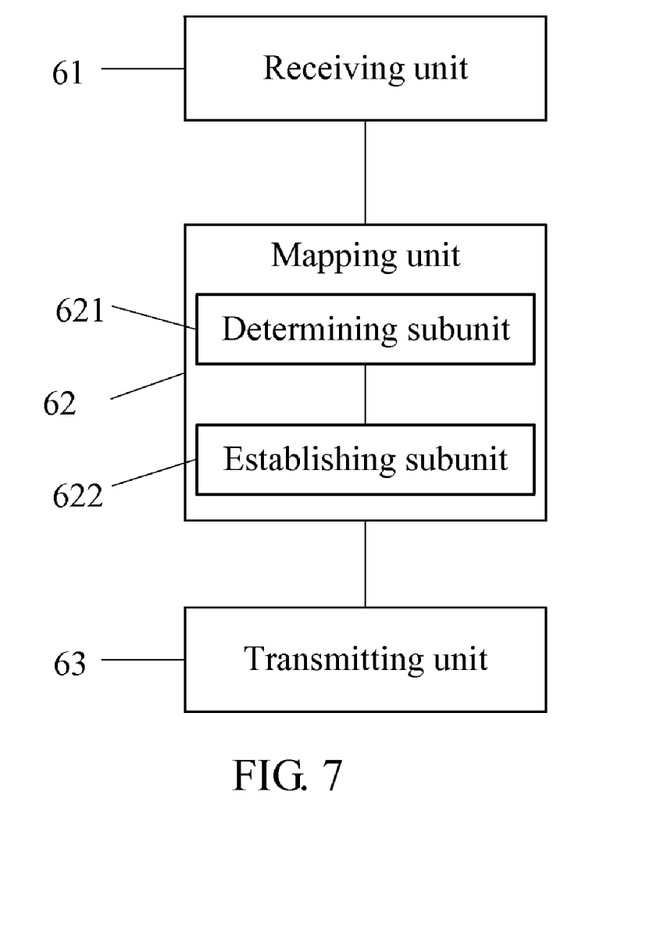
FIG. 7 a schematic diagram showing the structure of an auxiliary logic device according to another embodiment of the present invention.

As shown in FIG. 7, the mapping unit 62 provided in another embodiment of the present invention includes: (1) an determining subunit 621, adapted to determine the source address and destination address of data transmission according to the configuration information received by the receiving unit 61; and (2) an establishing subunit 622, adapted to establish a mapping relationship between the address in the cache and the address in the storage device according to the determination result of the determining subunit 621.

According to the device provided in this embodiment, in case of power failure of the storage system, the data in the cache is migrated to other storage devices according to the mapping relationship based on the configuration information. Thus, the data in the cache is written to the storage device in the backup mode, which protects the data in the cache and ensures that the data is not lost.

In addition, the CPU does not participate in the process of migrating data from the cache to the storage device in case of power failure. Furthermore, during the backup process, the power of the entire device is reduced effectively.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, and a mobile hard disk), and include several instructions that instruct a computer device (such as a personal computer, a server, or a network device) to perform the methods provided in each embodiment of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for storing data in a cache in case of power failure, comprising:
   receiving configuration information from a central processing unit (CPU) when a power failure occurs in a storage system by an auxiliary logic device, wherein upon completion of the configuration, the CPU is powered off;
   establishing a mapping relationship between an address of data in a cache and an address in a storage device by the auxiliary logic device; and
   sending a signaling message carrying the mapping relationship to the cache by the auxiliary logic device, so that the cache migrates the stored data to the storage device according to the signaling message.

2. The method of claim 1, wherein the receiving configuration information from the CPU by the auxiliary logic device comprises: receiving at least one of the following from the CPU by the auxiliary logic device: a source address and destination address of a data transmission, a size of transmitted data, and a data transmission direction.

3. The method of claim 2, wherein the establishing the mapping relationship between the address of data in the cache and the address in the storage device by the auxiliary logic device comprises:
   determining the source address and destination address of the data transmission according to the configuration information by the auxiliary logic device; and
   establishing the mapping relationship between the address of data in the cache and the address in the storage device by the auxiliary logic device according to the determination result.

4. An auxiliary logic device, comprising:
   a receiving unit, adapted to receive configuration information from a central processing unit (CPU) when a power failure occurs in a storage system;
   a mapping unit, adapted to establish a mapping relationship between an address of data in a cache and an address in a storage device; and
   a transmitting unit, adapted to send a signaling message carrying the mapping relationship established by the mapping unit, so that the cache migrates the data to the storage device according to the signaling message.

5. The auxiliary logic device of claim 4, wherein the mapping unit comprises:
   a determining subunit, adapted to determine a source address and destination address of a data transmission according to the configuration information; and
   an establishing subunit, adapted to establish the mapping relationship between the address of data in the cache and the address in the storage device according to the result of determining the source address and destination address of the data transmission.

6. A storage system, comprising an auxiliary logic device, a central processing unit (CPU), a cache and a storage device, wherein:
   the CPU is adapted to send configuration information to the auxiliary logic device, wherein upon completion of the configuration, the CPU is powered off;
   the auxiliary logic device is adapted to: receive the configuration information from the CPU, and send a signaling message carrying a mapping relationship between an address of data in the cache and an address in the storage device according to the configuration information;
   the cache is adapted to: store data, receive the signaling message from the auxiliary logic device when a power failure occurs in the storage system, and migrate the data to the storage device according to the signaling message; and
   the storage device is adapted to store the data migrated from the cache when the power failure occurs.

7. The storage system of claim 6, further comprising:
   a spare battery, adapted to supply power to at least one of the auxiliary logic device, the CPU, the cache and the storage device when the power failure occurs.

8. The storage system of claim 6, wherein the auxiliary logic device comprises:
   a receiving unit, adapted to receive the configuration information from the CPU in case of power failure of the storage system;
   a mapping unit, adapted to establish the mapping relationship between the address of data in the cache and the address in the storage device; and
   a transmitting unit, adapted to send a signaling message carrying the mapping relationship to the cache, so that the cache migrates the stored data to the storage device according to the signaling message.

9. Computer readable storage medium, comprising computer program codes when executed by a computer processor causing the compute processor to execute steps of:
   receiving configuration information from a central processing unit (CPU) when a power failure occurs in a storage system by a auxiliary logic device, wherein upon completion of the configuration, the CPU is powered off;
   establishing a mapping relationship between an address of data in a cache and an address in a storage device by the auxiliary logic device; and
   sending a signaling message carrying the mapping relationship to the cache by the auxiliary logic device, to notify the cache to migrate the stored data to the storage device according to the signaling message.

10. The computer readable storage medium according to claim 9, wherein the step of receiving configuration information from the CPU by the auxiliary logic device comprises:
    receiving at least one of the following from the CPU by the auxiliary logic device: a source address and destination address of a data transmission, a size of transmitted data, and a data transmission direction.

11. The computer readable storage medium according to claim 9, wherein the step of establishing the mapping relationship between the address of data in the cache and the address in the storage device by the auxiliary logic device comprises:
    determining the source address and destination address of the data transmission according to the configuration information by the auxiliary logic device; and
    establishing the mapping relationship between the address of data in the cache and the address in the storage device by the auxiliary logic device according to the result of determining the source address and destination address of the data transmission.

12. A direct memory access (DMA) controller comprising:
    a receiving unit, adapted to receive configuration information from a central processing unit (CPU) when a power failure occurs in a storage system;

a mapping unit, adapted to establish a mapping relationship between an address of data in a cache and an address in a storage device; and a transmitting unit, adapted to send a signaling message carrying the mapping relationship established by the mapping unit, so that the cache migrates the data to the storage device according to the signaling message.

13. The DMA controller of claim 12, wherein the mapping unit comprises:

a determining subunit, adapted to determine a source address and destination address of a data transmission according to the configuration information; and an establishing subunit, adapted to establish the mapping relationship between the address of data in the cache and the address in the storage device according to the result of determining the source address and destination address of the data transmission.

* * * * *

UNITED STATES PATENT AND TRADEMARK OFFICE
CERTIFICATE OF CORRECTION

PATENT NO. : 8,156,376 B2  Page 1 of 1
APPLICATION NO. : 12/607640
DATED : April 10, 2012
INVENTOR(S) : Liyao Chen

It is certified that error appears in the above-identified patent and that said Letters Patent is hereby corrected as shown below:

On the title page insert:

Item -- (30) Foreign Application Priority Data

November 10, 2008 (CN).............200810172111.5
       August 4, 2009    (CN)............PCT/CN2009/073081 --

Signed and Sealed this
Thirty-first Day of July, 2012

David J. Kappos
*Director of the United States Patent and Trademark Office*